(12) United States Patent
Shimokusuzono et al.

(10) Patent No.: US 6,316,534 B1
(45) Date of Patent: Nov. 13, 2001

(54) LUBRICATIVE RESIN COMPOSITION

(75) Inventors: Takumi Shimokusuzono; Masaki Egami, both of Mie (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 09/158,531

(22) Filed: Sep. 22, 1998

(30) Foreign Application Priority Data

Sep. 24, 1997 (JP) ................................... 9-258721

(51) Int. Cl.[7] .................. C08J 3/00; C08K 5/09; C08K 5/10; C08L 31/00; C08L 33/00
(52) U.S. Cl. .................... 524/284; 524/321; 508/101
(58) Field of Search .................... 524/284, 321, 524/543, 556; 508/101

(56) References Cited

U.S. PATENT DOCUMENTS 3,779,918 * 12/1973 Ikeda et al. .................... 252/126
4,012,478 * 3/1977 Horikawa et al. .
5,415,791 * 5/1995 Chou et al. .................... 252/12
5,482,987 * 1/1996 Forshirm .

FOREIGN PATENT DOCUMENTS 48-37572   11/1973 (JP) .

* cited by examiner

Primary Examiner—Patrick D. Niland
(74) Attorney, Agent, or Firm—Wenderoth, Lind & Ponack, L.L.P.

(57) ABSTRACT

A lubricative resin composition and a slide bearing made from such a resin. Even after a long-time slide movement, the friction coefficient is kept stably low and the wear is small. Moldability is also good. The lubricative resin composition is made up of 80–99.5 wt % of a synthetic resin which is either a mixture of 30–95 wt % of a polyamide resin and 5–70 wt % of a polyolefin, or a polyamide resin, and 0.5–20 wt % of a fatty acid having a carbon number of 10 or over and a melting point of 30° C. or under, such as montanic acid or stearic acid. A slide bearing is made from such a resin composition. Such slide bearings are used to support rotary shafts in a developing device for developing static latent images.

5 Claims, 2 Drawing Sheets

LUBRICATIVE RESIN COMPOSITION

BACKGROUND OF THE INVENTION

This invention relates to a lubricative resin composition, a slide bearing made from such a composition, and a developing device including such a bearing.

Compactness and lightness in weight are key elements required for office automation (OA) devices such as copiers, laser beam printers (LBP) and facsimiles, and magnetic recording devices such as video tape recorders (VTR), and other devices. Various measures are taken for slide bearings for supporting rotary shafts as important parts of these devices.

Slide bearings made of resin and thus less likely to change in sliding properties with temperature are used more often than ever before in compact and lightweight devices.

Known suitable materials for such slide bearings include a synthetic resin such as polyamide resin, polyphenylene sulfide resin or polyacetal resin in which is dispersed and retained a lubricating oil, and a synthetic resin such as an aromatic polyamide resin to which is added polytetrafluoroethylene or modified polyolefin resin.

An oil-containing resin composition disclosed in examined Japanese patent publication 46-5321 is a composition manufactured by stirring polyacetal or polyamide powder in excess lubricating oil at a high temperature, i.e. a temperature higher than the melting point of the resin used, cooling and then powdering the obtained synthetic resin, and remolding the powdered resin. During molding, lubricating oil tends to bleed out, thus causing difficulty in feeding the material by means of an extruder screw. Excess lubricant thus tends to bleed out onto the surface of the end product.

As lubricants to be mixed with the synthetic resin, those having functional groups which can physically or chemically adsorb to the surface of a metallic mating member, such as hydroxy groups or carboxy groups, have been preferred so that the resin composition will stably exhibit good lubricity even if only a thin oil film is formed (boundary lubrication).

In the oil lubricating field, especially in a field where only a thin film is formed (boundary lubrication), it is said that lubricity varies widely with the type of oil used. Lubricants having functional groups that can physically or chemically adsorb to a metallic material (oil or additives) are regarded as good boundary lubricants. Hydroxy groups and carboxy groups are known as typical adsorptive functional groups.

In examined Japanese patent publication 48-37572, an oil-containing resin composition is disclosed which is a plastics having a melting point higher than the molding temperature of a base plastics (resin as a main component) or having, at molding temperatures, a viscosity higher than the melt viscosity of the base plastics, and having a specific surface area of 0.01 m$^2$/g or over, and containing a saturated or unsaturated higher fatty acid or its salt or ester, an amide, a chlorine compound or a metallic soap.

Examined Japanese patent publication 48-37572 utilizes good compatibility of polyethylene with hydrocarbon oil to provide an oil-containing resin composition containing a large amount of lubricating oil in a base plastics such as polyamide. The kind of hydrocarbon oil used is not limited.

When this conventional oil-containing resin composition is used at normal or higher-than-normal temperatures, lubricating oil is dispersed and retained in the form of droplets in the matrix (resin). This makes it difficult to supply lubricating oil onto the metal surface at a stable speed over a long period of time because the speed with which lubricant is supplied onto the surface varies with the distribution density of the lubricating oil droplets and their size.

Also, if a sliding state continues for a long time, it becomes increasingly difficult to lubricate sliding surfaces with such a conventional oil-containing resin composition, thus increasing the possibility of seizure.

If lubrication is insufficient on the surface of slide bearings supporting both ends of sensitizing rollers as developing agent carriers or latent image retainers in developing devices of copiers and LBP's, the rotating speed of the sensitizing rollers tends to fluctuate due to fluctuation in the slide resistance. This can cause a problem fatal to copiers and printers, i.e. blurred images.

Furthermore, conventional oil-containing resin compositions are not smoothly fed by an extruder screw for molding. Thus, the molded articles tend to suffer mold deposit (delamination). Also, a large amount of oil tends to bleed out onto the surface.

An object of the invention of the present application is to provide a highly wear-resistant lubricative resin composition, and to make a slide bearing from such a composition so that the friction coefficient can be maintained stably at a low level even if its sliding surface is used for a long time.

For the moldability of the lubricative resin composition, its physical properties should be controlled such that the composition can be supplied to a screw at a stable speed, and be fed reliably by the screw with little mold deposite, and that the molded article will be least likely to suffer delamination. Another object is to prevent excessive bleeding of oil onto the surface of the molded article.

SUMMARY OF THE INVENTION

According to the present invention, there is provided a lubricative resin composition comprising 80–99.5 wt % of a synthetic resin, and 0.5–20 wt % of a fatty acid having a carbon number of 10 or over and a melting point not less than 30° C.

The synthetic resin should preferably contain 5–70 wt % of a polyolefin resin. Also, a polyamide resin is preferable as the synthetic resin.

The synthetic resin may also comprise 30–95 wt % of a polyamide resin and 5–70 wt % of a polyolefin resin.

The polyolefin resin may be one or more polyolefin resins selected from polyethylene resins and modified polyethylene resins.

According to the present invention, there are also provided slide bearings made from any of the above-described lubricative resin compositions.

According to the present invention, there is also provided a developing device including a rotary static latent image retainer having a surface on which a latent image is adapted to be formed, a developing roller kept in contact with the surface of the static latent image retainer for applying powdery developing agent on the surface of the retainer, a transfer means for transferring the developing agent stuck on the surface of the developing roller onto a sheet by rotating the static latent image retainer, and a plurality of rotary shafts provided in the developing device, the rotary shafts being supported by slide bearings having sliding portions made from a lubricative resin composition.

As a result of our research about the oil retaining state and the sliding properties of the lubricative resin composition according to the present invention, it was found that fatty acids having a carbon number of 10 or over and a melting point not less than 30° C. disperse in the resin in the form of solid particles, thus lowering the friction coefficient of the composition more than do liquid fatty acids having a carbon number of less than 10, and are less likely to reduce the mechanical strength of the composition. Especially if the resin is a polyamide, this tendency is remarkable.

Since fatty acids contain carboxylic acid groups, they easily disperse in the synthetic resin as a main component. Fatty acids having a carbon number of 10 or over are less likely to evaporate during melting and kneading or during molding, and also they can suppress high water absorbency of the polyamide.

Thus, a solid-state fatty acid is stably present over the entire surface of the synthetic resin molded article, so that even in a state in which it slides for a long time, the friction coefficient is maintained stably at a low level, thus reducing the amount of self wear of the sliding surface.

The lubricative resin composition in which is added a polyolefin resin, and slide bearings made from this composition are low in frictional resistance at the initial stage of sliding. And thereafter, a low friction coefficient is maintained stably for a long time. That is, the friction resistance does not increase. This is presumably due to excellent affinity of the fatty acid for polyolefin resins dispersed and mixed uniformly in the resin composition and having methylene groups.

Other features and objects of the present invention will become apparent from the following description made with reference to the accompanying drawings, in which:

DETAILED DESCRIPTION OF THE PREFERRED EMBODIMENT

Figure 1:
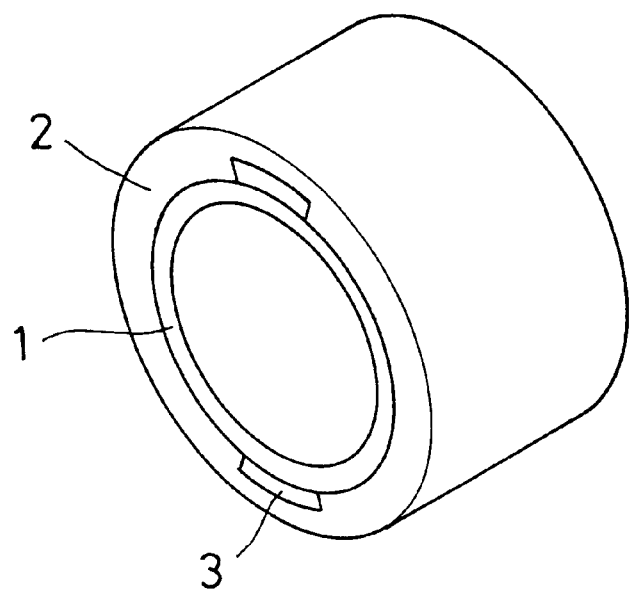
FIG. 1 is a perspective view of a slide bearing embodying the present invention.

The synthetic resin used in this invention is not limited to any specific kind and may be a thermosetting or thermoplastic resin. Synthetic resins usable in this invention are listed below:

phenolic resin, urea resin, melsnin resin, polyamide resin, polyacetal resin, polycarbonate resin, methacrylate resin, polystyrene, ABS resin, polyetherimide resin, polyamideimide resin, polyimide resin, ionomer resin, polyphenylene oxide, methylpentene polymer, polyallyl sulfone, polyallyl ether, polyether ketone, polyphenylene sulfide, polysulfone, aromatic polyester, polyethylene terephthalate, polybutylene terephthalate, fluororesin, thermoplastic elastomer and a blend of any of the above resins and a high polymer.

Among these resins, polyamide resins are high in compatibility with polyolefin resins and fatty acids and show excellent lubricating properties. Thus they are especially preferable as the synthetic resin used in this invention.

Polyamide resins usable in the present invention include aliphatic polyamide resins such as polyhexamethylene adipamide (6, 6-nylon), polyhexamethylene azelamide (6, 9-nylon), polyhexamethylene sebasamide (6, 10-nylon), polyhexamethylene decamide (6, 12-nylon), polytetramethylene adipamide (4, 6-nylon), polycaprolactam (6-nylon), polylaurinelactam (12-nylon), and poly-11-aminoundecane (11-nylon), and aromatic polyamide resins such as polymethaphenylene isophthalamide, polyparaphenylene terephthalamide, and metaxylyleneadipamide (nylon MXD-6). They may be used singly or in combination.

Among these polyamides, nylon 6, nylon 12 are preferable because they show excellent lubricating properties when mixed with polyolefin and fatty acids.

The polyolefin resin used in this invention is not limited as long as it shows high affinity with fatty acids. Polyolefin resins usable in this invention include polyethylene, polypropylene, propylene-ethylene (block or random) copolymer, ethylene-propylene elastomer, ethylene-propylene-dicyclopentadiene elastomer, ethylene-acrylic ester copolymer, ethylene-vinyl acetate copolymer, chlorinated polyolefin, modified polyolefin and water-crosslinked polyolefin.

Polyethylene resins are resins having repeating units-$CH_2$—$CH_2$— in the main chain, and any of low-density, straight-chain and low-density, medium-density, high-density or ultra-high-molecular weight ones can be used. A straight-chain resin or a branched one having $CH_3$ branches may be used. The content of $CH_3$ in a branched polyethylene may be 1–50% (wt % or mole %), about 3–10% or 10–30%. Such a polyethylene resin may be manufactured by any method used for the manufacture of thermoplastic resins, i.e. melt molding such as injection molding or extrusion molding, or compression molding.

High-density (high-molecular weight) polyethylene resins are especially high in wear resistance, self lubricity, shock resistance, and chemical resistance. An injection-moldable polyethylene resin containing both an ultra-high-molecular weight component and a low-molecular weight component are preferable.

Modified polyethylene resins are preferable because they improve compatibility with polyamide resins. A preferred modified polyethylene is formed by graft-polymerizing a graft monomer such as α, β-unsaturated carboxylic acid or its derivative with the above-mentioned polyethylenes.

α, β-unsaturated carboxylic acids include acrylic acid, methacrylic acid, maleic acid, fumaric acid, tetrahydrophthalic acid, itaconic acid, citraconic acid, crotonic acid, and endo-cis-bicyclo (2,2,1)hepto 5 en 2,2-dicarboxylic acid (2,2,1). Maleic acid and the last-mentioned are especially preferable.

Polyethylene resins other than those listed above include low-molecular weight polyethylenes, chlorinated polyethylenes, crosslinked polyethylenes and foamed polyethylenes. Two or more of such polyethylenes may be used in combination. If two or more polyethylenes are used, to 100 parts by weight of a polyethylene as a main component, other polyethylenes are added in about 1–80 parts by weight, preferably about 5–50 parts, more preferably about 25–40 parts by weight.

Just for information, commercial polyethylene resins include Hi-Zex (high-density), Hi-Zex Million (ultra-high molecular weight), LUBMER (high-molecular weight) made by Mitsui Petrochemical, and Hostalene GUR (ultra high-molecular weight).

Preferably, the content of the polyolefin resin in the synthetic resin is 5–70 wt % with respect to the synthetic resin. If its content is lower than 5 wt %, it is impossible to sufficiently improve sliding properties. If higher than 70 wt %, the mechanical properties of the molded product will decrease, and good end product will not be obtainable due to delamination. Taking these factors into consideration, more preferable content of polyolefin is 5–40 wt %.

If the synthetic resin is a combination of polyamide resins and polyolefin resins, the content of the polyamide resin in the synthetic resin is adjusted preferably to 30–95 wt %, more preferably 60–95 wt %, according to the content of the polyolefin resin.

The fatty acid having a carbon number of 10 or more used in this invention may be any known saturated or unsaturated fatty acid such as listed below. Among them, considering decomposability of the fatty acid, a higher fatty acid of C16 or over is especially preferable.

As the saturated fatty acid, mainly monohydric fatty acids of C10 or over may be used. They include decanoic acid (capric acid), undecanoic acid, dodecannoic acid (lauric acid), tridecanoic acid, tetradecanoic acid (myristic acid), pentadecanoic acid, hexadecanoic acid (palmitic acid), heptadecanoic acid (margaric acid), octadecanoic acid (stearic acid), nonadecanoic acid, eicosanoic acid (arachidic acid), heneicosanoic acid, docosanoic acid (behenic acid), tricosanoic acid, tetracosanoic acid (lignoceric acid), pentacosanoic acid, hexacosanoic acid (cerotic acid), heptacosanoic acid, octacosanoic acid (montanic acid), nonacosanoic acid, triaconoic acid (melissic acid), hentriaconoic acid, dotriacontanoic acid (lacceric acid), tetratriaconoic acid, hexatriacontanoic acid, octatriaconoic acid.

Unsaturated fatty acids include phytocetoleic acid, myristoleic acid, zoomaric acid, elaidic acid, vaccenic acid, physeteric acid, palmitoleic acid, petroselinic acid, gadoleic acid, erucic acid, brassylic acid, selacholeic acid, tariric acid, ximenynic acid, linoelaidic acid.

The above-listed fatty acids are all commercially available. For example, montanic acid is sold by Hoechst under the name of Hoechst WAS-S, and stearic acid is sold by MOF Corporation under the trade name of NAA-180.

The content of the polyolefin resin to the synthetic resin is 5–70 wt %. If this content is under 5 wt %, it is impossible to sufficiently improve sliding properties. If higher than 70 wt %, the mechanical properties of the molded product will decrease, and good end product will not be obtainable due to delamination. Taking these factors into consideration, more preferable content of polyolefin is 5–40 wt %.

The above materials of the lubricative resin composition may be mixed together by a conventional method. For example, a synthetic resin as a substrate, and a polyolefin and a fatty acid are dispersed in a solvent such as acetone or fluorochlorohydrocarbon, mixed in a mixer such as a Henschel mixer, a ball mill or a tumbler mixer, the solvent is removed, and the mixture is supplied directly to an injection molder or melt-extruder (e.g. twin-screw extruder), or after melt-mixed beforehand using heat rollers, a Banbury mixer or a melt extruder.

The lubricative resin composition according to the present invention should preferably be molded by extrusion molding, injection molding, compression molding, vacuum molding, blow molding or foam molding. From the viewpoint of manufacturing efficiency, injection or extrusion molding is especially preferred.

In an amount that will not hamper the object of the invention, additives known in the synthetic resin art may be added to the lubricative resin composition of this invention. Such additives include release agents, flame retardants, antistatic agents, weather resistance improvers, antioxidants, colorants, and industrial lubricants such as tetrafluoroethylene and graphite.

Also, what is known as oil-retaining agents may be added to the lubricative resin composition of this invention. Any oil-retaining agents may be used which retain fatty acids in the molded article of the lubricative resin composition while allowing fatty acids to bleed out at a controlled speed. Preferable oil-retaining agents are inorganic, porous materials having a large specific surface area, such as talc, clay, calcium carbonate, carbon, graphite and activated charcoal.

As long as it will not impair the lubricity of the lubricative resin composition according to the invention, an intermediate or end product may be subjected to chemical or physical modification treatment to improve its properties.

The thus manufactured lubricative resin composition according to this invention is high in lubricating properties and suited as materials for slide bearings and sealing members used in office machines, information processing machines, automobiles, and home electric appliances.

The slide bearing according to the present invention has at least its slide surface forming portion made from the lubricative resin composition according to this invention. The housing portion supporting the slide surface forming portion may or may not be formed from the lubricative resin composition according to the invention.

A slide bearing embodying the present invention is described with reference to FIG. 1.

The slide bearing shown in FIG. 1 comprises a cylindrical slide portion 1 made from the above lubricative resin composition, and a cylindrical housing 2 (made from a metal, resin rubber or ceramic) fitted around the slide portion 1. Resin members 3 are press-fitted in axial dovetail grooves formed in the inner surface of the housing 2 to prevent relative rotation of the members 1 and 2.

Since high mechanical strength is not required for the slide portion 1, its material can be selected from a large variety of materials having good sliding properties. In selecting the material for the housing 2, priority should be given to mechanical properties and durability. Made from different materials, the slide portion and the other parts of the slide bearing assembly exhibit different functions separately. If no high mechanical strength is required, however, the slide portion and the housing may be integrally formed from the same material.

Figure 2:
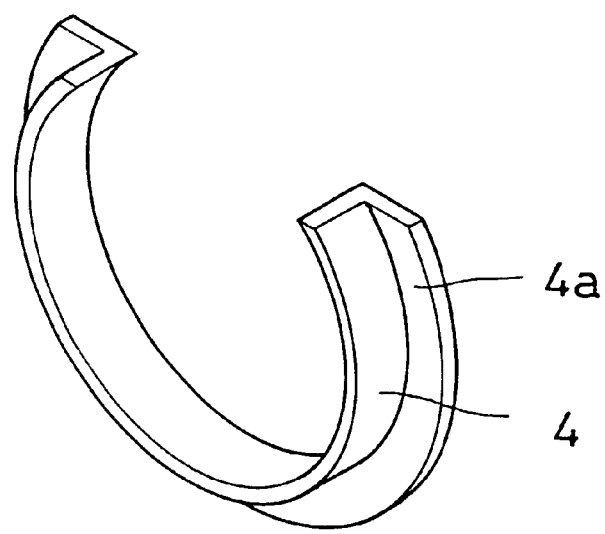
FIG. 2 is a perspective view of a slide portion embodying the present invention.

If the radial load applied to the slide bearing is in a constant direction or partial, a slide portion 4 of a C-shaped bearing with flange 4*a* shown in FIG. 2 may be formed from the abovementioned lubricative resin composition.

The slide bearing embodying the present invention is high in initial sliding properties and less likely to deteriorate in slide properties with time, and can be used advantageously as bearings for rotary shafts of e.g. office (OA) machines and audiovisual (AV) machines.

Figure 3:
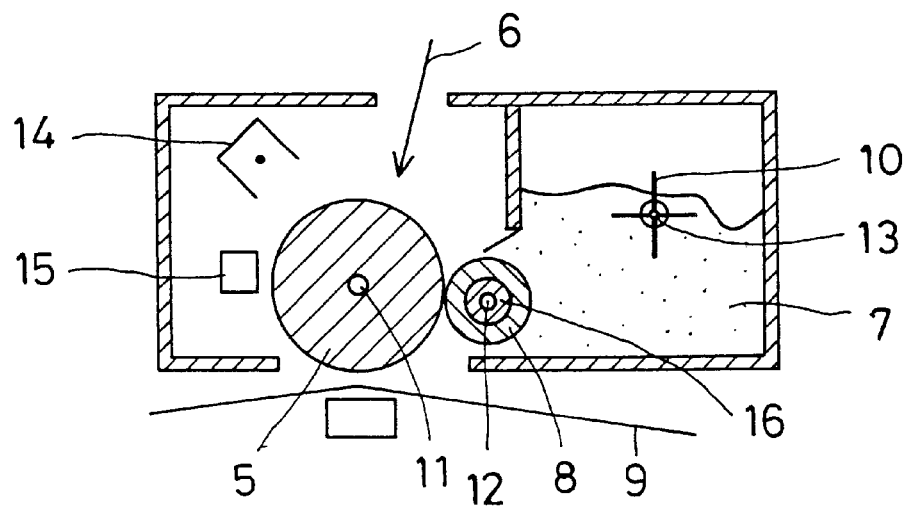
FIG. 3 is a schematic sectional view of a developing device embodying the present invention.

FIG. 3 shows a developing device embodying the present invention.

As shown in FIG. 3, the developing device of this embodiment has a roll-shaped static latent image retainer 5 having a surface on which a static latent image is formed by being irradiated with light 6 from an exposure device provided outside the device, such as a laser beam, a developing roller 8 kept in contact with the surface of the image retainer 5 for applying powdery developing agent 7 such as toner to the image retainer 5, and a transfer means for transferring the developing agent 7 stuck on the surface of the developing roller 8 to a sheet 9 by rotating the image retainer 5. Slide bearings are used to support rotary shafts 11, 12 and 13 of the static latent image retainer 5, developing roller 8 and a stirring rotary vane 10. The slide bearings have their slide surfaces made from the lubricative resin composition of the present invention.

In the developing device shown in FIG. 3, a 2-component developing method is used. Instead of the roll-shaped static latent image retainer 5 (photosensitive drum), a photosensitive belt may be used. The device further includes a charger 14, a cleaner 15 and a magnetic member 16.

EXAMPLES

Materials used in this invention are shown below. Abbreviations are in brackets.
(1) polycaprolactam resin (PA 1)
   AMILAN CA1007 made by Toray
(2) Polyraulinlactum resin (PA 2)
   DAIAMID L1640 made by DAICEL-HULS LTD.
(3) high-molecular weight polyethylene (PE 1)
   LUBMER L4000 made by Mitsui Petrochemical
(4) modified polyethylene resin (modified PE)
   manufactured by fully mixing anhydrous maleic acid and organic peroxide in high-molecular weight polyethylene (PE 1), reacting the mixture in a molten state using a double-screw extruder at 250° C., and pelletizing it with a pelletizer
(5) PA6.PE resin
   LUBMER LS4160 made by Mitsui Petrochemical
(6) Fatty acid 1; $CH_3(CH_2)_{26}COOH$
   Hoechst-WAX S made by Hoechst in Germany (montanic acid), melting point 90.5° C., no boiling point
(7) Fatty acid 2; $CH_3(CH_2)_{16}COOH$
   stearic acid NAA-180 made by MOF Corporation, melting point 69.9° C., boiling point 360° C.
(8) Fatty acid 3; $CH_3(CH_2)_6COOH$
   octoic acid made by Wako Pure Chemical Industries, Ltd., melting point 69.9° C., boiling point 360° C.
(9) Fatty acid ester 3; $CH_3(CH_2)_{26}COOCH_2CH_2OOC(CH_2)_{26}CH_3$
   Hoechst-WAX E (ester wax) made by Hoechst
(10) Fatty acid amine; $CH_3(CH_2)_{16}CH_2NH_2$
   stearylamine (reagent) made by Wako Pure Chemical Industries, Ltd.
(11) alcohol; $CH_3(CH_2)_{1-6}CH_2OH$
   stearyl alcohol (reagent) made by Wako Pure Chemical Industries, Ltd.
(12) polyethylene wax; $CH_3(CH_2CH_2)_nCH_3$
   Hoechst-WAX PE 190 made by Hoechst
(13) ester oil
   UNISTER H481R made by MOF Corporation
(14) silicone oil
   KF96-1000 cst made by Shin-Etsu Chemical Co., limited
(15) synthetic hydrocarbon oil
   Lurcant HC100 made by Mitsui Petrochemical
(16) polyoxymethylene resin (POM)
   DURACON M90-02 by Polyplastics Example 1

As shown in Table 1, 8 wt % fatty acid 1 was added to 92 wt % polycaprolactam (6-nylon resin) (PA 1), and the mixture was melted and kneaded by a double-screw extruder (BT 30 made by Research Laboratory of Plastics Technology Co., Ltd.) at 235° C. to form pellets. The pellets were injection-molded at 240° C. to form pin-shaped test pieces having a diameter of 3 mm.

Example 2

As shown in Table 1, a molten mixture comprising 70 wt % polycaprolactam (6-nylon resin) (PA 1) and 30 wt % polyethylene resin (PE 1) was prepared, and 8 wt % fatty acid 1 was added to 92 wt % of the molten mixture. Pin-shaped test pieces were formed in exactly the same way as in Example 1.

Example 3

As shown in Table 1, a mixture of 70 wt % polycaprolactam (6-nylon) resin (PA 1) and 30 wt % modified polyethylene resin (modified PE) was melt-mixed at 240° C. to obtain a polymer alloy, and 5 wt % fatty acid 1 was added to 95 wt % of the thus obtained polymer alloy. Pin-shaped test pieces were formed in exactly the same way as in Example 1.

Example 4

As shown in Table 1, a mixture of 70 wt % polycaprolactam (6-nylon) resin (PA 1) and 30 wt % modified polyethylene resin (modified PE) was melt-mixed at 240° C. to obtain a polymer alloy, and 20 wt % fatty acid 1 was added to 80 wt % of the thus obtained polymer alloy. Then, pin-shaped test pieces were formed in exactly the same way as in Example 1.

Example 5

As shown in Table 1, a mixture of 70 wt % polycaprolactam (6-nylon) resin (PA 1) and 30 wt % modified polyethylene resin (modified PE) was melt-mixed at 240° C. to obtain a polymer alloy, and 8 wt % fatty acid 2 was added to 92 wt % of the thus obtained polymer alloy. Then, pin-shaped test pieces were formed in exactly the same way as in Example 1.

Example 6

As shown in Table 1, 8 wt % fatty acid 1 was added to 92 wt % polylaurinelactam (12-nylon) resin (PA 2), and the mixture was melted and kneaded by a twin-screw extruder at 190° C. to form pellets. The pellets were injection-molded at 195° C. to form pin-shaped test pieces having a diameter of 3 mm.

Example 7

As shown in Table 1, a mixture of 95 wt % polycaprolactam (6-nylon) resin (PA 1) and 5 wt % modified polyethylene resin (modified PE) was melt mixed at 240° C. to obtain a polymer alloy, and 8 wt % fatty acid 1 was added to 92 wt % of the thus obtained polymer alloy. Then, pin-shaped test pieces were formed in exactly the same way as in Example 1.

Example 8

As shown in Table 1, a mixture of 30 wt % polycaprolactam (6-nylon) resin (PA 1) and 70 wt % modified polyethylene resin (modified PE) was melt mixed at 240° C. to obtain a polymer alloy, and 8 wt % fatty acid 1 was added to 92 wt % of the thus obtained polymer alloy. Then, pin-shaped test pieces were formed in exactly the same way as in Example 1.

Example 9

As shown in Table 1, 10 wt % fatty acid 1 was added to 90 wt % commercial PA6.PE resin (LUBMER LS4160), and pin-shaped test pieces were formed in exactly the same way as in Example 1.

Example 10

As shown in Table 1, a mixture of 70 wt % polylaurinelactam (12-nylon) resin (PA 2) and 30 wt % modified polyethylene resin (modified PE) was melted at 190° C., and 8 wt % fatty acid 1 was added to 92 wt % of the thus obtained polymer alloy. The mixture was then melted and kneaded by a twin-screw extruder at 190° C. to form pellets. The pellets were injection-molded at 195° C. to form pin-shaped test pieces having a diameter of 3 mm.

Comparative Example 1

As shown in Table 2, polylaurinelactam resin (6-nylon) resin (PA 1) was injection-molded at 240° C. to form pin-shaped test pieces of 3 mm diameter.

Comparative Example 2

As shown in Table 2, polylaurinelactam resin (12-nylon) resin (PA 2) was injection-molded at 190° C. to form pin-shaped test pieces of 3 mm diameter.

Comparative Example 3

As shown in Table 2, 25 wt % fatty acid 1 was added to 75 wt % polycaprolactam (6-nylon resin) (PA 1), and the mixture was melted and kneaded by a twin-screw extruder at 235° C. to form pellets. The pellets were injection-molded at 240° C. to form pin-shaped test pieces having a diameter of 3 mm.

Comparative Example 4

As shown in Table 2, a mixture of 75 wt % polylaurinelactam (12-nylon) resin (PA 2) and 25 wt % fatty acid 1 was melted and injection-molded at 190° C. to form pin-shaped test pieces having a diameter of 3 mm.

Comparative Example 5

As shown in Table 2, a mixture of 92 wt % polycaprolactam (6-nylon) resin (PA 1) and 8 wt % fatty acid 3 was melted and kneaded by a twin-screw extruder at 235° C. to form pellets. The pellets were injection-molded at 240° C. to form pin-shaped test pieces having a diameter of 3 mm.

Comparative Example 6

As shown in Table 2, 70 wt % polycaprolactam (6-nylon) resin (PA 1) and 30 wt % polyethylene resin (PE 1) was melt-mixed, and 92 wt % of the thus obtained polymer alloy and 8 wt % fatty acid ester were melted and kneaded by a twin-screw extruder at 235° C. to form pellets. The pellets were injection-molded at 240° C. to form pin-shaped test pieces having a diameter of 3 mm.

Comparative Example 7

As shown in Table 2, 70 wt % polycaprolactam (6-nylon) resin (PA 1) and 30 wt % polyethylene resin (PE 1) was melt-mixed, and 92 wt % of the thus obtained polymer alloy and 8 wt % amine were melted and kneaded by a twin-screw extruder at 235° C. to form pellets. The pellets were injection-molded at 240° C. to form pin-shaped test pieces having a diameter of 3 mm.

Comparative Example 8

As shown in Table 2, 70 wt % polycaprolactam (6-nylon) resin (PA 1) and 30 wt % polyethylene resin (PE 1) was melt-mixed, and 92 wt % of the thus obtained polymer alloy and 8 wt % alcohol were melted and kneaded by a twin-screw extruder at 235° C. to form pellets. The pellets were injection-molded at 240° C. to form pin-shaped test pieces having a diameter of 3 mm.

Comparative Example 9

As shown in Table 2, 70 wt % polycaprolactam (6-nylon) resin (PA 1) and 30 wt % polyethylene resin (PE 1) was melt-mixed, and 92 wt % of the thus obtained polymer alloy and 8 wt % ester oil were melted and kneaded by a twin-screw extruder at 235° C. to form pellets. The pellets were injection-molded at 240° C. to form pin-shaped test pieces having a diameter of 3 mm.

Comparative Example 10

As shown in Table 2, 70 wt % polycaprolactam (6-nylon) resin (PA 1) and 30 wt % polyethylene resin (PE 1) was melt-mixed, and 92 wt % of the thus obtained polymer alloy and 8 wt % polyethylene wax were melted and kneaded by a twin-screw extruder at 235° C. to form pellets. The pellets were injection-molded at 240° C. to form pin-shaped test pieces having a diameter of 3 mm.

Comparative Example 11

As shown in Table 2, 92 wt % polycaprolactam (6-nylon) resin (PA 1) and 8 wt % silicone oil were mixed together, and the mixture was melted and kneaded by a twin-screw extruder at 235° C. to form pellets. The pellets were injection-molded at 240° C. to form pin-shaped test pieces having a diameter of 3 mm.

Comparative Example 12

As shown in Table 2, 92 wt % polycaprolactam (6-nylon) resin (PA 1) and 8 wt % synthetic hydrocarbon oil were mixed together, and the mixture was melted and kneaded by a twin-screw extruder at 235° C. to form pellets. The pellets were injection-molded at 240° C. to form pin-shaped test pieces having a diameter of 3 mm.

Comparative Example 13

As shown in Table 2, 70 wt % polycaprolactam (6-nylon) resin (PA 1) and 30 wt % modified polyethylene (modified PE) were melted and kneaded, and 92 wt % of the polymer alloy obtained and 8 wt % silicone oil were mixed together. Then, pin-shaped test pieces were formed in exactly the same manner as in Example 1.

Comparative Example 14

As shown in Table 2, 70 wt % polycaprolactam (6-nylon) resin (PA 1) and 30 wt % modified polyethylene (modified PE) were melted and kneaded, and 92 wt % of the polymer alloy obtained and 8 wt % synthetic hydrocarbon were mixed together. Then, pin-shaped test pieces were formed in exactly the same manner as in Example 1.

Comparative Example 15

As shown in Table 2, 92 wt % polyoxymethylene resin (POM) and ester oil were melted and kneaded by a twin-screw extruder at 190° C. to form pellets. The pellets were then injection-molded to form pin-shaped test pieces having a diameter of 3 mm.

The pin-shaped test pieces of Examples and Comparative Examples were subjected to the following tests.

<<Pin-on-disk Test>>

A friction/wear test was conducted using a pin-on-disk type friction/wear tester at the contact pressure of 6 MPa (60 kgf/cm$^2$) with the speed at 4.2 m/min. and temperature at 30° C., using an aluminum alloy (A5056) containing Mg as a mating member. Evaluations were made on measured values for the friction coefficient and the specific wear rate (in $10^{-8}$ mm³/(N,m)) 20 hours after start of the test. The results are shown in Table 3.

<Tensile Strength>>

Under ASTM D638, the tensile strength was measured for Example 2 and Comparative Example 9. As a result, the tensile strength was 432 kgf/cm² for Example 2 and 286 kgf/cm² for Comparative Example 9.

As will be apparent from the results of Table 3, 20 hours after the start of the test, the friction coefficient was small and stable and the specific wear rate was small for Examples 1–10.

In contrast, for Comparative Examples 1, 2 and 6–15, the friction coefficient was large and unstable and the specific wear rate was large. Comparative Examples 11 and 13, which used silicone oil, damaged the mating member. In comparative Example 5, a large amount of gas produced during kneading. This is presumably due to vaporization of fatty acid. Also, Comparative Example 5 was large in specific wear rate, though the friction coefficient was small. For Comparative Examples 3 and 4, weighing of resin during injection molding was unstable and not easy. Also, the surfaces of the molded products were not smooth. Thus, no friction/wear test was conducted.

According to the present invention, fatty acid in a solid form is supplied onto the surface of the lubricative resin composition. Thus, the friction coefficient is maintained stably at a low level and the wear of the resin composition is small even if put in a sliding state for a long time. Thus, the mating member is less likely to be damaged, and the mechanical strength inherent to the synthetic resin substrate is maintained.

With the lubricative resin composition mixed and dispersed in a synthetic resin such as polyamide, a synthetic resin to which are added polyolefin resins such as polyethylene resin or modified polyethylene resin, or a synthetic resin to which are added polyamide resin and polyolefin resin, and with the slide bearing made from such a lubricative resin composition, these effects are more remarkable.

For the moldability of the lubricative resin composition, the feed speed when fed to a screw is stable and mold-deposit is less likely to occur. Thus, delamination is also less likely to occur. Also, it is possible to prevent bleeding of oil from the surface of the molded product.

As for the developing device of the present invention, since the rotary shafts are supported by the slide bearing of this invention, the rotary shafts can be driven stably with a small torque. This makes it possible to use a small, low-power motor to drive the rotary shafts and thus to reduce the size of the developing device.

TABLE 1

| | Examples | | | | | | | | | |
|---|---|---|---|---|---|---|---|---|---|---|
| | 1 | 2 | 3 | 4 | 5 | 6 | 7 | 8 | 9 | 10 |
| (1) PA① | 92 | 64.4 (70) | 66.5 (70) | 56 (70) | 64.4 (70) | — | 87.4 (95) | 27.6 (30) | — | — |
| (2) PA② | — | — | — | — | — | 92 | — | — | — | 64.4 (70) |
| (3) PE① | — | 27.6 (30) | — | — | 27.6 (30) | — | 4.6 (5) | — | — | — |
| (4) Modified PE | — | — | 28.5 (30) | 24 (30) | — | — | — | 64.4 (70) | — | 27.6 (30) |
| (5) PA6.PE | — | — | — | — | — | — | — | — | 90 | — |
| (6) Fatty acid ① | 8 | 8 | 5 | 20 | — | 8 | 8 | 8 | 10 | 8 |
| (8) Fatty acid ② | — | — | — | — | 8 | — | — | — | — | — |

The contents in weight %
The values in brackets indicate contents in weight % when synthetic resin materials (1)–(4) are mixed.

TABLE 2

| | Comparative Examples | | | | | | |
|---|---|---|---|---|---|---|---|
| | 1 | 2 | 3 | 4 | 5 | 6 | 7 |
| (1) PA① | 100 | — | 75 | — | 92 | 64.4 (70) | 64.4 (70) |
| (2) PA② | — | 100 | — | 75 | — | — | — |
| (3) PE① | — | — | — | — | — | 27.6 (30) | 27.6 (30) |
| (6) Fatty acid① | — | — | 25 | 25 | — | — | — |
| (8) Fatty acid③ | — | — | — | — | 8 | — | — |
| (9) Fatty acid ester | — | — | — | — | — | 8 | — |
| (10) Fatty acid amine | — | — | — | — | — | — | 8 |

| | 8 | 9 | 10 | 11 | 12 | 13 | 14 | 15 |
|---|---|---|---|---|---|---|---|---|
| (1) PA① | 64.4 (70) | 64.4 (70) | 64.4 (70) | 64.4 (70) | 64.4 (70) | 64.4 (70) | 64.4 (70) | — |
| (3) PE① | 27.6 | 27.6 | 27.6 | 27.6 | 27.6 | — | — | — |

TABLE 2-continued

|  | (30) | (30) | Comparative Examples | | | | | |
|---|---|---|---|---|---|---|---|---|
|  |  |  | (30) | (30) | (30) |  |  |  |
| (4) Modified PE | — | — | — | — | — | 27.6 (30) | 27.6 (30) | — |
| (11) Alcohol | 8 | — | — | — | — | — | — | — |
| (12) Ester oil | — | 8 | — | — | — | — | — | 8 |
| (13) Polyethylene wax | — | — | 8 | — | — | — | — | — |
| (14) Silicone oil | — | — | — | 8 | — | 8 | — | — |
| (15) Synthetic hydrocarbon oil | — | — | — | — | 8 | — | 8 | — |
| (16) POM | — | — | — | — | — | — | — | 92 |

Contents in weight %
The values in brackets indicate contents in weight % when synthetic resin materials (1)–(4) are mixed.

TABLE 3

| Examples | | | Comparative Examples | | |
|---|---|---|---|---|---|
| Number | Friction coefficient | Specific wear‡ | Number | Friction coefficient | Specific wear‡ |
| 1 | 0.130 | 219 | 1 | 0.350 | 450 |
| 2 | 0.107 | 203 | 2 | 0.320 | 412 |
| 3 | 0.096 | 152 | 3 | — | — |
| 4 | 0.089 | 182 | 4 | — | — |
| 5 | 0.091 | 127 | 5 | 0.128 | 474 |
| 6 | 0.126 | 93 | 6 | 0.144 | 246 |
| 7 | 0.098 | 170 | 7 | 0.138 | 240 |
| 8 | 0.093 | 185 | 8 | 0.142 | 286 |
| 9 | 0.089 | 105 | 9 | 0.160 | 287 |
| 10 | 0.097 | 76 | 10 | 0.155 | 323 |
|  |  |  | 11 | 0.180 | 546 |
|  |  |  | 12 | 0.170 | 348 |
|  |  |  | 13 | 0.170 | 303 |
|  |  |  | 14 | 0.160 | 252 |
|  |  |  | 15 | 0.250 | 278 |

‡Unit of specific wear: ($10^{-8}$ mm$^3$/(N.m))

What is claimed is:

1. A lubricative resin composition consisting of 80–99.5 wt % of a thermoplastic resin composition consisting of 30–95 wt % of a polyamide resin and 5–70 wt % of a polyolefin resin, and 0.5–20 wt % of a fatty acid having a carbon number of 10 or more and a melting point not less than 30° C., wherein said fatty acid is dispersed uniformly due to affinity with said resins.

2. A lubricative resin composition as claimed in claim 1, wherein said polyolefin resin is one or more polyolefin resins selected from polyethylene resins and modified polyethylene resins.

3. A lubricative resin composition as claimed in claim 1, wherein said polyolefin resin is one or more polyolefin resins selected from polyethylene resins and polyethylene resins obtained by graft-polymerizing α, β-unsaturated carboxylic acids with polyethylenes.

4. A slide bearing having a sliding portion consisting of a lubricative resin composition claimed in claim 1, 3 or 2.

5. A developing device including a rotary static latent image retainer having a surface on which a latent image is adapted to be formed, a developing roller kept in contact with the surface of said static latent image retainer for applying powdery developing agent on the surface of said retainer, a transfer means for transferring the developing agent stuck on the surface of said developing roller onto a sheet by rotating said static latent image retainer, and a plurality of rotary shafts provided in the developing device, said rotary shafts being supported by slide bearings having sliding portions made from a lubricative resin composition claimed in claim 1, 3, or 2.

* * * * *